(12) United States Patent
Beringer et al.

(10) Patent No.: US 12,692,035 B2
(45) Date of Patent: Jul. 28, 2026

(54) ASSEMBLY LINE CONTROL SYSTEM AND METHOD

(71) Applicant: Anheuser-Busch, LLC, St. Louis, MO (US)

(72) Inventors: Joseph Beringer, Kennesaw, GA (US); Russel Mathis, New Athens, IL (US)

(73) Assignee: Anheuser-Busch, LLC, St. Louis, MO (US)

( * ) Notice: Subject to any disclaimer, the term of this patent is extended or adjusted under 35 U.S.C. 154(b) by 0 days.

(21) Appl. No.: 18/573,292

(22) PCT Filed: Jun. 21, 2022

(86) PCT No.: PCT/US2022/034333
§ 371 (c)(1),
(2) Date: Dec. 21, 2023

(87) PCT Pub. No.: WO2022/271692
PCT Pub. Date: Dec. 29, 2022

(65) Prior Publication Data
US 2024/0294291 A1 Sep. 5, 2024

Related U.S. Application Data

(60) Provisional application No. 63/213,471, filed on Jun. 22, 2021.

(51) Int. Cl.
*B65B 57/08* (2006.01)
*B65B 35/44* (2006.01)
(Continued)

(52) U.S. Cl.
CPC ............. *B65B 57/08* (2013.01); *B65B 35/44* (2013.01); *B65B 65/003* (2013.01); *B65G 15/22* (2013.01);
(Continued)

(58) Field of Classification Search
USPC .............................................. 53/67
See application file for complete search history.

(56) References Cited

U.S. PATENT DOCUMENTS 4,361,759 A * 11/1982 King ................... B65G 47/682
250/223 R
6,860,381 B2 3/2005 Newsom et al.
(Continued)

FOREIGN PATENT DOCUMENTS

WO 2021019054 A1 2/2021

OTHER PUBLICATIONS

International Search Report issued in corresponding International Application No. PCT/US2022/034333, mailed Dec. 28, 2022.
(Continued)

*Primary Examiner* — Chinyere J Rushing-Tucker
(74) *Attorney, Agent, or Firm* — Husch Blackwell LLP

(57) ABSTRACT

An assembly line system comprising including a programable controller, a priority component, a first section upstream of the priority component that includes upstream backup detecting sensors, and a second section downstream of the priority component that includes downstream backup detecting sensors. In operation, the programable controller identifies whether there is a backup in the first and/or second section from a current status of each of the upstream and downstream backup detecting sensors and alters an operating speed of the priority component responsive thereto so as to avoid micro stops of the priority component.

8 Claims, 5 Drawing Sheets

(51) Int. Cl.
    *B65B 65/00*       (2006.01)
    *B65G 15/22*       (2006.01)
    *B65G 43/10*       (2006.01)
    *G06Q 10/08*      (2023.01)
    *G06Q 50/04*      (2012.01)

(52) U.S. Cl.
    CPC ............. *B65G 43/10* (2013.01); *G06Q 10/08*
           (2013.01); *G06Q 50/04* (2013.01)

(56)              References Cited

U.S. PATENT DOCUMENTS

| | | |
|---|---|---|
| 7,909,155 B2 | 3/2011 | Lupton et al. |
| 2004/0144623 A1* | 7/2004 | Newsom .............. B65G 47/261 |
| | | 198/781.01 |
| 2007/0073566 A1 | 3/2007 | Reaume |
| 2023/0195083 A1* | 6/2023 | Odegard ........... G05B 19/4182 |
| | | 700/230 |

OTHER PUBLICATIONS

Written Opinion issued in corresponding International Application No. PCT/US2022/034333, mailed Dec. 28, 2022.

\* cited by examiner

102

Load high speed value into speed control variable for critical component

100

104

Operate critical component at a speed corresponding to the current value of the speed control variable

106

Is an upstream or downstream backup occurring?

No

Yes

Load low speed value into speed control variable for critical component

108

300

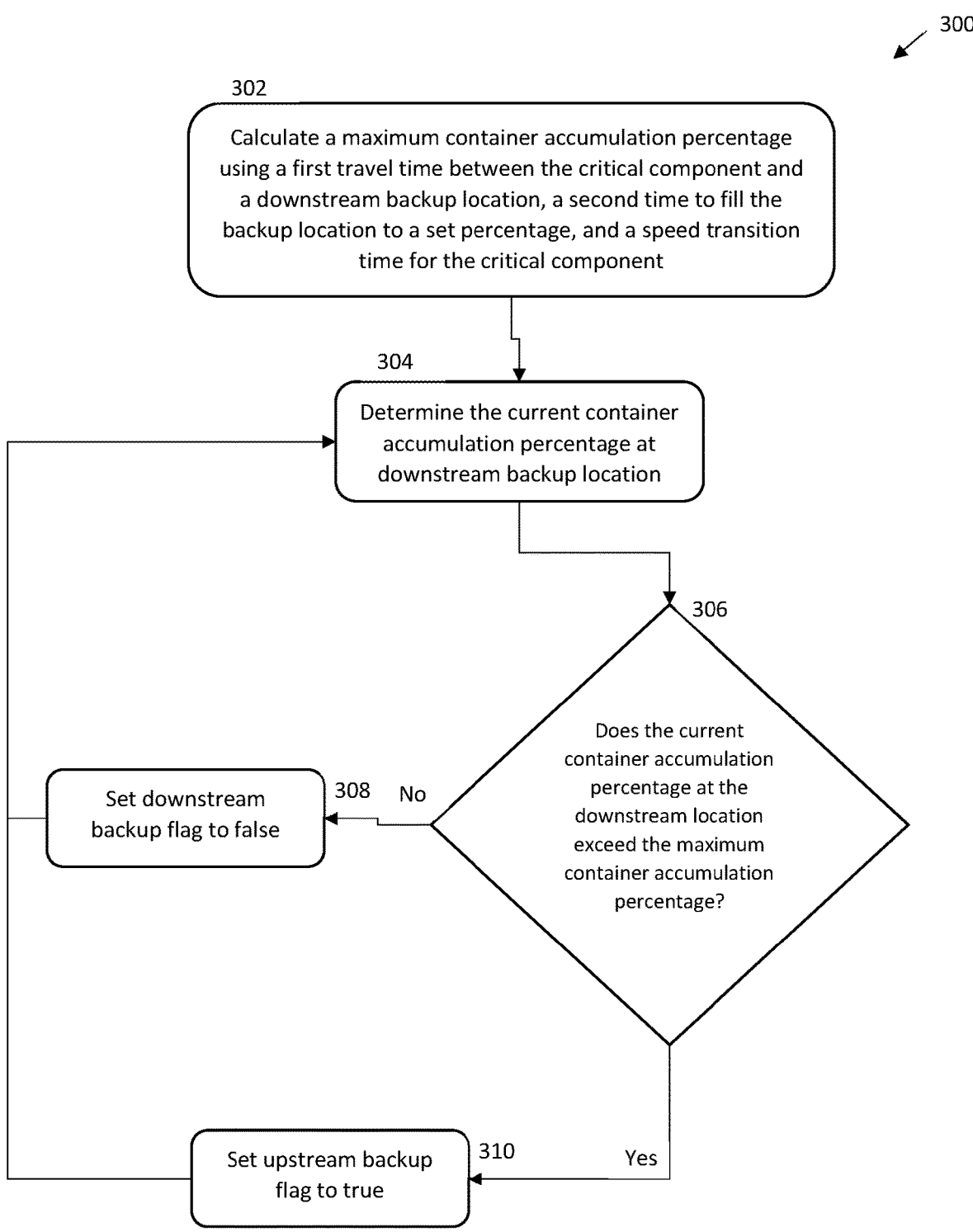

302

Calculate a maximum container accumulation percentage using a first travel time between the critical component and a downstream backup location, a second time to fill the backup location to a set percentage, and a speed transition time for the critical component

304

Determine the current container accumulation percentage at downstream backup location

306

Does the current container accumulation percentage at the downstream location exceed the maximum container accumulation percentage?

308    No

Set downstream backup flag to false

310    Yes

Set upstream backup flag to true

FIG. 6

ASSEMBLY LINE CONTROL SYSTEM AND METHOD

CROSS-REFERENCE TO RELATED APPLICATION

This application claims the benefit of the filing date of U.S. Provisional Application Ser. No. 63/213,471 filed Jun. 22, 2021, entitled, "Assembly Line Control System and Method", which is hereby incorporated by reference as if fully set forth herein.

FIELD OF THE INVENTION

This disclosure provides an assembly line control system and method for operating same. More specifically, the disclosure relates to systems and methods for operating a container filling and packaging assembly line so as to minimize micro-stops of priority components to maximize overall efficiency and throughput.

BACKGROUND OF THE INVENTION

Efficiently operating a container filling and packaging assembly line can be a complex task that involves careful monitoring and control of each component in the assembly line to avoid unnecessarily stopping and starting of priority components such as a container filler component. Some existing systems and methods provide such monitoring and control using overly complex software products and algorithms that greatly increase the cost associated with such process and are not easily adaptable to accommodate new additions or changes to the components and operation of the assembly line. For example, such known systems and methods employ proprietary sensors and local, remote, or cloud server systems that have to be inefficiently interfaced with the control system for the assembly line components.

In light of the foregoing, there is an ongoing need for improved systems and methods.

BRIEF DESCRIPTION OF THE DRAWINGS

For a better understanding of the various embodiments of the subject disclosure, reference may be made to the accompanying drawings in which:

FIG. 6 illustrates a flow diagram of a method according to disclosed embodiments; and While the disclosure is susceptible to various modifications and alternative forms, specific embodiments thereof are shown by way of example in the drawings and will herein be described in detail. It should be understood, however, that the drawings and detailed description presented herein are not intended to limit the disclosure to the particular embodiment disclosed, but on the contrary, the intention is to cover all modifications, equivalents, and alternatives falling within the spirit and scope of the present disclosure.

DETAILED DESCRIPTION

Figure 1:
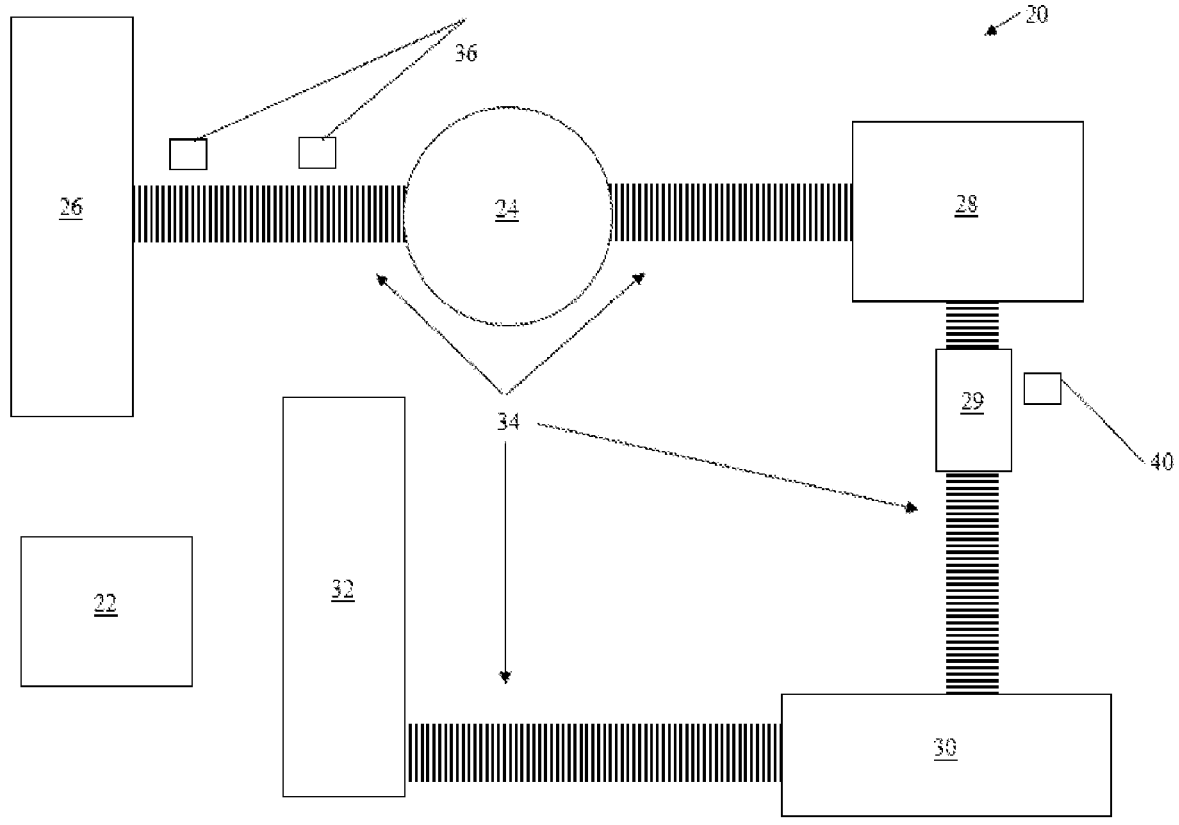
FIG. 1 illustrates a schematic diagram of an assembly line and assembly line control system according to disclosed embodiments.

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

Embodiments described herein are directed to systems and methods for operating a container filling and packaging assembly line so as to minimize micro-stops of priority components to maximize overall efficiency and throughput.

FIG. 1 illustrates a schematic diagram of an assembly line system 20 according to disclosed embodiments. As seen in FIG. 1 , the assembly line system 20 can include a programmable controller 22, a priority component 24, an upstream component 26, a plurality of downstream components 28, 29, 30, and 32, a plurality of conveyor belts 34, upstream backup detecting sensors 36, and one or more downstream backup detecting sensors 40.

In some embodiments, the programable controller 22 can be electrically coupled via wired or wireless mediums to the priority component 24, the upstream component 26, the plurality of downstream components 28, 29, 30, and 32, the plurality of conveyor belts 34, the upstream backup detecting sensors 36, and the one or more downstream backup detecting sensors 40 so as to control the operation of each of the components.

In some embodiments, the programable controller 22 can include a single programmable logic controller (PLC) coupled to each of the components. Additionally or alternatively, in some embodiments, the programable controller 22 can include a plurality of PLCs each coupled to one or more of the components of the assembly line system 20. In any embodiment, it is to be understood that the programable controller 22 as disclosed herein can include a transceiver device and a memory device, each of which can be in communication with control circuitry, one or more programmable processors, and executable control software as would be understood by one of ordinary skill in the art. In some embodiments, the control software can be stored on a transitory or non-transitory computer readable medium, including, but not limited to local computer memory, random access memory (RAM), optical storage media, magnetic storage media, flash memory, and the like. And some or all of the control circuitry, the programmable processors, and the control software can execute and control at least some of the methods described herein.

Various embodiments for each of the components of the assembly line system 20 are contemplated. For example, in some embodiments, the priority component 24 can include a filler component configured to fill containers with a liquid or other product; the upstream component 26 can include a depalletizer configured to remove unfilled containers from pallets; the downstream component 28 can include a pasteurizer configured to pasteurize the product once filled into a container; the downstream component 29 can include accumulation tables or conveyors; the downstream component 30 can include a packer configured to package groups of filled containers; and the downstream component 32 can include a palletizer configured to place groups of the packed containers onto pallets for transportation.

In operation and as describe in more detail below with respect to FIGS. 4-6, the programable controller 22 can be configured to adjust the speed of the priority component 24 (e.g. how fast it fills the containers) when the programable controller 22 identifies either upstream backups (e.g. not enough containers reaching the priority component 24) or downstream backups (e.g. not enough space for containers to leave the priority component 24 after being filled).

In some embodiments, the assembly line system 20 can include a legacy assembly line system that can be retrofitted to work with the process for controlling the operation of the priority component 24 as described herein. In these embodiments, the retrofitting process can include pre-implementation data gathering and modifications to the default operation of the assembly line system 20 and programing of the programmable controller 22 in accordance with the pre-implementation data.

For example, in some embodiments, the pre-implementation steps can include obtaining a layout of the assembly line system 20 including 1) a location of all existing sensors including whether the sensor is upstream or downstream of the priority component 24 and a side of the conveyor belts 34 the sensor resides; and 2) the width of the conveyor belts 34 at the location of each sensor.

Figure 2:
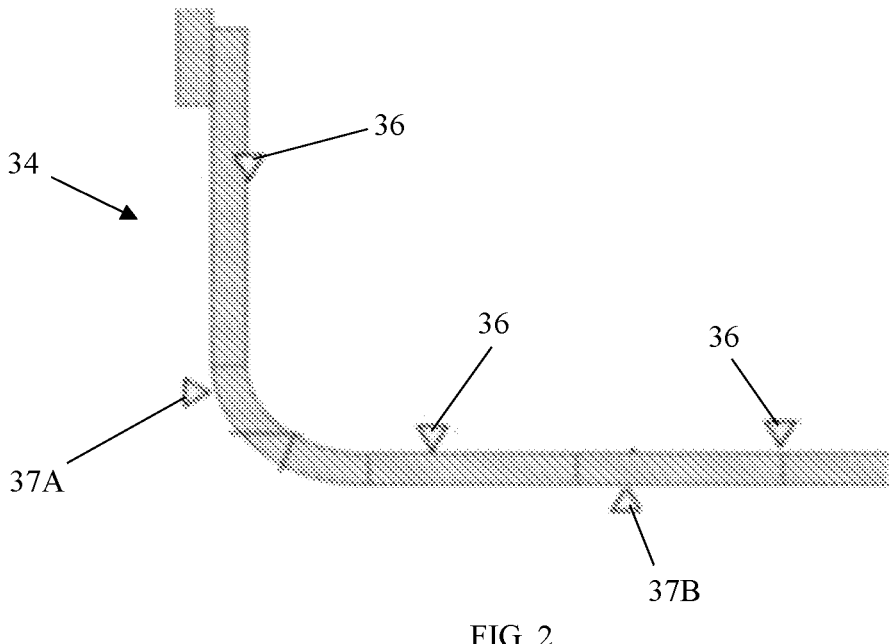
FIGS. 2 and 3 illustrate partial schematic views of sections of an assembly line according to disclosed embodiments.
Figure 3:
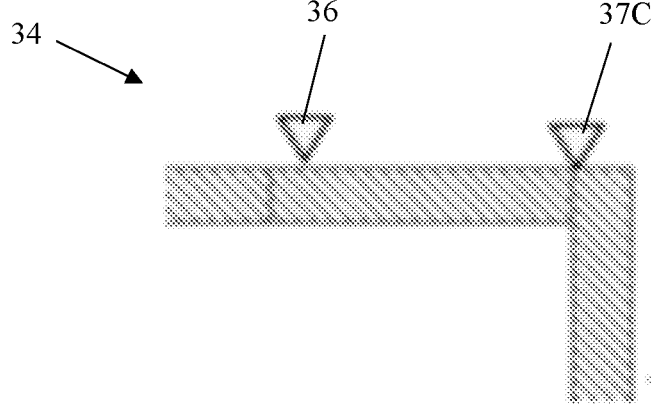

After all of the sensors are identified, a subset of the sensors can be selected for use as the upstream backup detecting sensors 36. In particular, in some embodiments, the upstream backup detecting sensors 36 can include the sensors of the assembly line system 20 that are upstream of the priority component 24 and are positioned at locations unlikely to give a false reading. FIGS. 2 and 3 show sensors 37A, 37B, and 37C having locations on the conveyor belts 34 that can typically result in false readings. In particular, sensor 37A of and 37B of FIG. 2 are located on a side of the conveyor belts 34 that containers will naturally travel too fast when the conveyor belts 34 are not at full accumulation and for that reason can be excluded from the upstream backup detecting sensors 36. Furthermore, sensor 37C of FIG. 3 can be excluded from the upstream backup detecting sensors 36 because it is positioned directly before or after a ninety degree bend in the conveyor belts 34 where excess pressure could damage containers. Further still, any sensors used solely for jam detection, that do not remain blocked when a conveyor should be 100% populated due to conveyor transitions where achieving 100% population could cause excess pressure, and or that are otherwise triggered when the conveyor is not 100% populated can be excluded from the upstream backup detecting sensors 36. Accounting for all of these situations can improve the accuracy with which the programable controller 22 identifies backups in the upstream section of assembly line system 20.

Additionally, in some embodiments, the pre-implementation steps can include adjusting the default operating speeds of every component of the assembly line system 20 to follow a V-curve where all machines upstream and downstream of the priority component 24 are configured to run faster than the priority component 24 so as to keep the priority component 24 running as long as possible. For example, in some embodiments, the upstream component 26 can be configured with a high speed that is greater than a high speed of the priority component 24. In some embodiments, the high speed for the upstream component 26 can be approximately 10% faster than the high speed of the priority component 24.

Similarly, the programable controller 22 can be configured to modulate the speed of the conveyor belts 34 such that any sections of the conveyor belts 34 that are upstream of the priority component 34 can speed up to close gaps and fully populate the width of the conveyor belts 34. In particular, the upstream sections of the conveyor belts 24 can be configured to run with a 100% population of empty containers under normal or default operating conditions.

Additionally, in some embodiments, locations of some sensors and/or components can be adjusted to maximize efficient operation. For example, in some embodiments, a filler low prime sensor can be positioned as close as possible to the priority component 24 and a discharge backup sensor for the upstream component 26 can be positioned as close to the upstream component 26 as possible.

Similarly, in some embodiments, the downstream component 30 (e.g. the packer) can be configured to run at a high speed that is greater than the high speed of the priority component 24, and in some embodiments can be approximately 10% faster. In some embodiments, combiner components can be tuned to supply a container throughput for the downstream component 30 sufficient to keep the downstream component 30 operating at its high speed when downstream line accumulation is present. In some embodiments, the downstream component 28 can be configured with a default operation of 90% of full capacity to allow for a 10% increase in throughput in the event that a downstream backup is detected. Furthermore, in some embodiments, the programable controller 22 can be configured to modulate the speed of the conveyor belts 34 that are downstream of the priority component 24 based on the current speed setting of the priority component. For example, in some embodiments, the downstream portions of conveyor belts 24 can be configured to run at approximately 50% population of filled containers under normal conditions and at approximately 100% population under recovery conditions such that the downstream portions of conveyor belts 34 can fill completely when the line is backing up due to a downstream backup or stoppage.

In some embodiments, the pre-implementation process can include gathering various timing data values for the operation of the assembly line system 20 under the revised default operating conditions discussed above. In some embodiments, capturing this timing data can be done in a controlled, consistent production run. In some embodiments, the timing data can include travel times between machines from machine center to machine center, a time to fill downstream component 29 (e.g. accumulation tables) to 10%, and the times it takes the priority component 24 to back up when the downstream component 28 is stopped and the priority component 24 is operating at 1) the high speed and 2) a reduced speed such as approximately 85% of the high speed.

After the pre-implementation steps described above have been completed, the retrofitting process can include programming the programmable controller 22 to operate the assembly line system 20 to account for downstream and upstream backups. In particular, the programming process can include hardcoding various variables and instructions directly into the memory of the programable controller 22.

For example, in some embodiments, one set of variables coded into the memory of the programable controller 22 can include respective weight values for each of the upstream backup detecting sensors 36. In some embodiments, the respective weight values can be a function of the width of the conveyor belts 34 at the respective location of each of the upstream backup detecting sensors 36 and a travel distance along the conveyor belts 34 to a next one of the upstream backup detecting sensors 36. An example weight calculation for a sensor number N at a location L of the upstream backup detecting sensors 36 is shown below as Equation 1.

$$Weight\_of\_Sensor\_N = \qquad\qquad\qquad Equation\ 1$$

$$Conveyor\_width\_at\_L * Distance\_to\_Sensor\_N + 1$$

In such embodiments, the respective weight for each of the upstream backup detecting sensors 36 can refer to the area downstream between that sensor and the next sensor. Furthermore, in some embodiments, instead of excluding one or more of the upstream sensors from the upstream backup detecting sensors 36 as discussed above, a scaling factor can be introduced to the respective weight calculation for those sensors that tend to produce inaccurate readings to correct or account for those inaccuracies.

In some embodiments, additional values coded into the memory of the programmable controller 22 can include the high speed value for the priority component 24, the low speed value for the priority component 24, a bypass threshold value, an evaluation threshold value, a slowdown range, a speed up range, a maximum container accumulation percentage, and various delay timer values.

Additionally or alternatively, in some embodiments, the programable controller 22 can be configured to calculate one or more of the high speed value for the priority component 24, the low speed value for the priority component 24, the bypass threshold value, the evaluation threshold value, the slowdown range, the speed up range, the maximum container accumulation percentage, and the various delay timer values based on specific functions and other variables coded into the memory of the programable controller 22.

Irrespective of whether the values are hard coded into the memory or calculated by the processor from other variables, in some embodiments, the slow down range can include an upstream accumulation percentage calculated by the programable processor 22 as discussed in more detail below of approximately 35-65% and the speed up range can be an upstream accumulation percentage of approximately 25-75%. Furthermore, in some embodiment the bypass threshold value can be approximately 12% of the identified time it took the priority component 24 to back up when the downstream component 28 was stopped and the priority component 24 was operating at the high speed. Similarly, in some embodiments, the evaluation threshold value can be approximately 6% of the identified time it took the priority component 24 to back up when the downstream component 28 was stopped and the priority component 24 was operating at the high speed.

Figure 4:
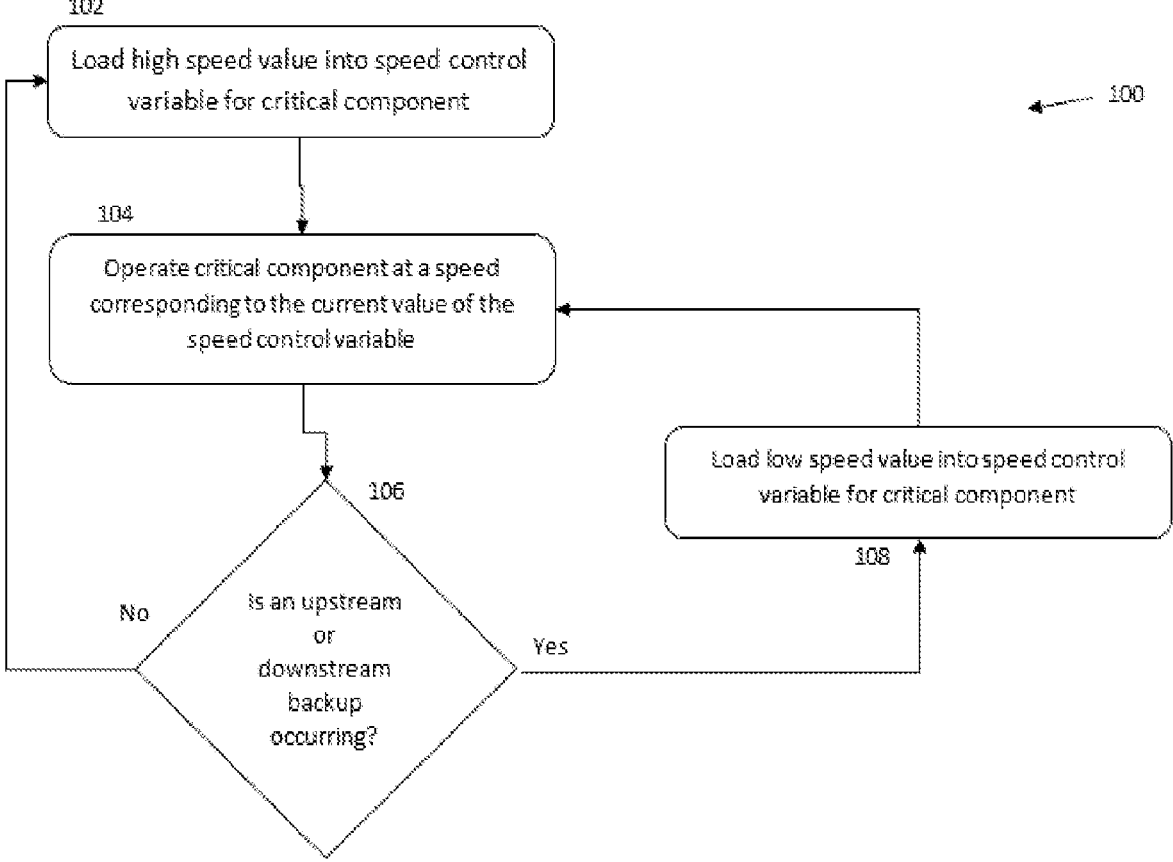
FIG. 4 illustrates a flow diagram of a method according to disclosed embodiments.

FIG. 4 illustrates a method 100 for operating the assembly line system 20 using the programable controller 22 to account for downstream and upstream backups according to disclosed embodiments. As seen in FIG. 4, the method 100 can include the programable controller 22 loading the high speed value into a speed control variable for the priority component 24, as in 102. Then, the method 100 can include, the programable controller 22 initiating operation of the priority component 24 at a speed corresponding to a current value of the speed control variable, as in 104. Next, the method 100 can include the programable controller 22 determining whether there is an upstream or downstream backup, as in 106. When the programable controller 22 determines there is no upstream or downstream backup occurring, the method 100 can include the programable controller 22 loading the high speed value into the speed control variable for the priority component 24, as in 102. However, when the programable controller 22 determines there is an upstream or downstream backup occurring, the method 100 can include the programable controller 22 loading the low speed value into the speed control variable for the priority component 24, as in 102, and then initiating operation of the priority component 24 at a speed corresponding to the current value of the speed control variable, as in 104.

Figure 5:
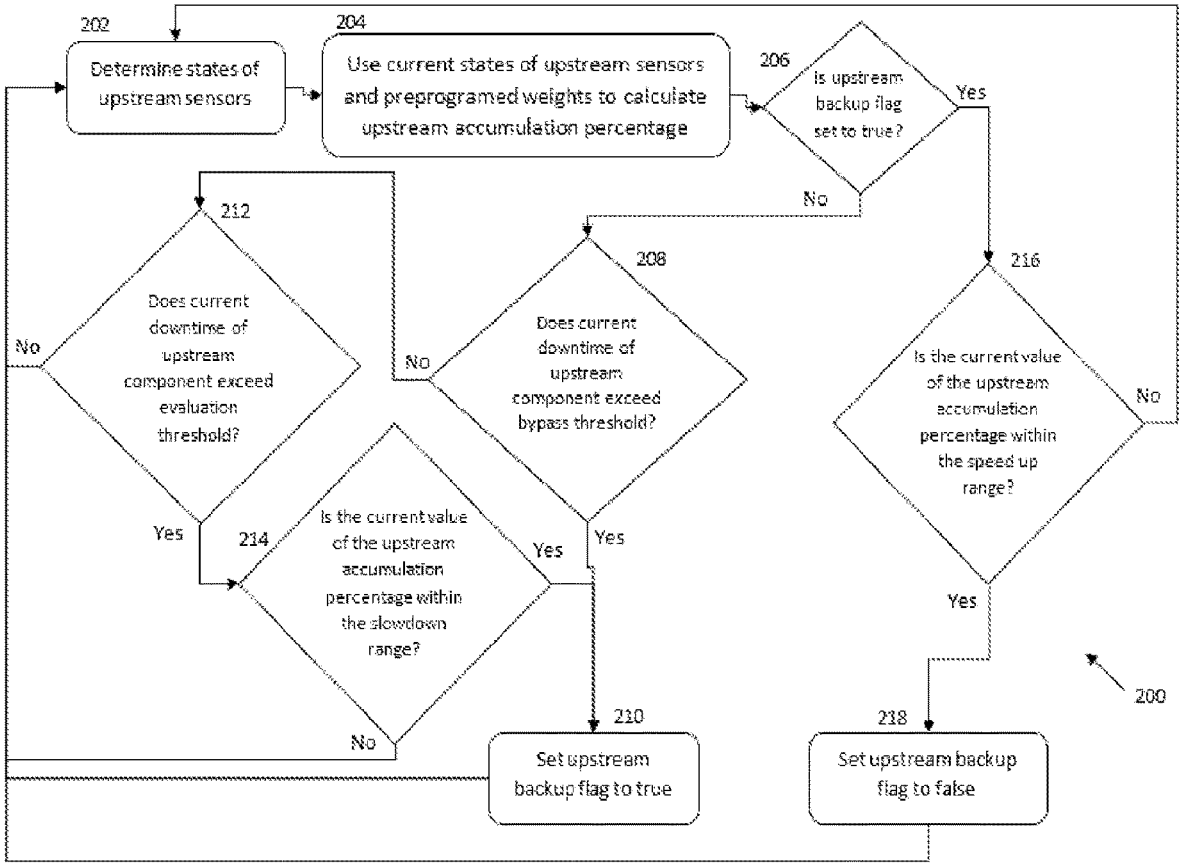
FIG. 5 illustrates a flow diagram of a method according to disclosed embodiments.

FIG. 5 illustrates a method 200 for determining, by the programable controller 22, whether an upstream backup is occurring in the assembly line system 20 according to disclosed embodiments. As seen in FIG. 5, in some embodiments, the method 200 can include the programable controller 22 determining the current state of each of the upstream backup detecting sensors 36, as in 202. In some embodiments, the current respective state of each of the upstream backup detecting sensors 36 can be represented by a digital logic one when the respective sensor detects a container in its proximity and a digital logic zero when the respective sensor fails to detect a container within its proximity. In some embodiments, the representations can be reversed. Furthermore, various embodiments by which the respective state of the upstream backup detecting sensors 36 can be communicated to the programable controller 22 are contemplated, including but not limited to embodiments where the programable controller 22 requests the current respective state of each of the upstream backup detecting sensors 36 and embodiments where each of the upstream backup detecting sensors 36 push the respective state value to the programable controller 22 either periodically, or when a change from the previous state is detected. In some embodiments, the programable controller 22 can employ various debounce timers as known in the art to ensure that the current value for the respective state of a each of the upstream backup detecting sensors 36 is at a stable equilibrium before continuing on with the method 200.

After determining the respective state of each of the upstream backup detecting sensors 36, the method 200 can include the programable controller 22 using the current states of upstream backup detecting sensors 36 and their associated weight values stored in the memory of the programable controller 22 to calculate the upstream accumulation percentage, as in 204. In some embodiments, this calculation can include first computing an accumulation buffer value and then dividing the accumulation buffer value by a buffer total to determine the upstream accumulation percentage. For example, in embodiments where a digital value of one corresponds to a sensor detecting a container in its proximity, the accumulation buffer can be calculated according to Equation 2 below and the buffer total can correspond to the value output by Equation 2 when the respective state for each of the upstream backup detecting sensors 36 is the digital value 1.

$$
\begin{aligned}
\text{Accumulation Buffer} = {}& \text{Sensor0\_state} * \text{Sensor0\_weight} + \\
& \text{Sensor1\_state} * \text{Sensor1\_weight} + \\
& \quad \ldots \text{SensorN\_state} * \text{SensorN\_weight}
\end{aligned}
\qquad \text{Equation 2}
$$

Furthermore, in embodiments where the programable controller 22 corresponds to multiple PLCs associated with different one of the upstream backup detecting sensors 36, an intermediate accumulation buffer value can be calculated at each PLC and passed on to the next PLC in the chain which will add the previous intermediate accumulation buffer calculation to its own calculation in succession such that the accumulation buffer calculated by the final PLC in the chain will correspond to the total accumulation buffer value for the upstream section of the assembly line system 20.

After calculating the upstream accumulation percentage, the method 200 can include the programable controller 22 determining whether an upstream backup flag has been set to true, as in 206. When the upstream backup flag has not been set to true, the method 200 can include the programable controller 22 determining whether a current operational downtime of the upstream component 26 (e.g. the depalletizer) exceeds the bypass threshold stored in the memory of the programable controller 22, as in 208. When the current operational downtime of the upstream component 26 does exceed the bypass threshold, the method 200 can include the programmable controller 22 setting the upstream backup flag to true as in 210. However, when the current operational downtime of the upstream component 26 fails to exceed the bypass threshold, the method 200 can include the programmable controller 22 determining whether the current operational downtime of the upstream component 26 exceeds the evaluation threshold stored in the memory of the programable controller 22, as in 212. When the current operational downtime of the upstream component 26 does exceed the evaluation threshold, the method 200 can include the programable controller 22 determining whether the current value of the upstream accumulation percentage is within the slowdown range saved in the memory of the programmable controller 22, as in 214. When the upstream accumulation percentage is within the slowdown range, the method 200 can include the programmable controller 22 setting the upstream backup flag to true, as in 210. Furthermore, when the current operational downtime of the upstream component 26 fails to exceed the evaluation threshold, when the upstream accumulation percentage fails to be within the slowdown range, or after the programmable controller 22 has set the upstream backup flag to true, the method 200 can include the programable controller 22 continuing to determine the current state of each of the upstream backup detecting sensors 36, as in 202.

However, when, in 206, the programmable controller 22 determines that the upstream backup flag is set to true, the method 200 can include determining whether the current value of the upstream accumulation percentage within the speed up range stored in the memory of the programmable controller 22, as in 216. When the current value of the upstream accumulation percentage is within the speed up range, the method 200 can include the programmable controller 22 setting the upstream backup flag to false, as in 218. Furthermore, when the current value of the upstream accumulation percentage fails to be within the speed up range and after the programable controller 22 has set the upstream backup flag to false, the method 200 can include the programable controller 22 continuing to determine the current state of each of the upstream backup detecting sensors 36, as in 202.

FIG. 6 illustrates a method 300 for determining, by the programable controller 22, whether the downstream backup is occurring in the assembly line system 20 according to disclosed embodiments. As seen in FIG. 6, in some embodiments, the method 300 can include calculating a maximum downstream container accumulation percentage using a first travel time between the priority component 24 and a downstream backup location such as the downstream component 29 (e.g. the accumulation tables or conveyors), a second time to fill the downstream backup location to a set percentage, and a speed transition time for the priority component 24, as in 302. In some embodiments, the programable controller 22 can calculate the maximum downstream container accumulation percentage. Additionally, in some embodiments, the maximum downstream container accumulation percentage can be externally calculated and hard coded into the memory of the programable controller 22 for use in executing the method 300.

After calculating and/or recalling from memory the maximum downstream container accumulation percentage, the method 300 can include the programable controller 22 determining a current container accumulation percentage at the downstream backup location using the downstream backup detecting sensors 40, as in 304. In embodiments where the downstream backup location includes the downstream component 29, the downstream backup detecting sensors 40 can be integrated with the downstream component 29 and can include proximity sensors that count motor shaft sprockets to produce a full 0-100% resolution of container volume at the downstream component 29. However, in other embodiments, the downstream backup detecting sensors 40 can include one or more separate discreet sensors located at one or more trigger locations that are associated with various fill percentages for the downstream component 29.

After determining the current container accumulation percentage, the method 300 can include the programmable controller 22 determining whether the current container accumulation percentage exceeds the maximum container accumulation percentage, as in 306. When the current container accumulation percentage fails to exceeds the maximum container accumulation percentage, the method 300 can include the programmable controller 22 setting a downstream backup flag to false, as in 308. However, when the current container accumulation percentage does exceed the maximum container accumulation percentage, the method 300 can include the programmable controller 22 setting the downstream backup flag to true, as in 310. Then, after setting the downstream backup flag to true or false, the method 300 can include continuing to determine the current container accumulation percentage at the downstream backup location using the downstream backup detecting sensors 40, as in 304. In some embodiments, the programable controller 22 can immediately transition the priority component 24 between the high speed and the low speed depending on whether an upstream or downstream backup is occurring. However, in some embodiments, the programable controller 22 can be configured to alter the speed from high to low or low to high after expiration of a corresponding delay timer. In some embodiments, the programable controller 22 can continue to determine whether there is upstream or downstream backup while the time delay is operating to capture any changes in the upstream and downstream backup detecting sensors that would remove the need to alter the speed of the priority component 24. These embodiments can operate to prevent overly frequent speed changes that can lead to costly jams of the priority component 24. Various embodiments, for implementing the speed change delay are contemplated including delay of changing the state of downstream or upstream backup flags, delaying of loading the high or low speed into the speed control variable, and/or delaying of operating the priority component 24 according to a changed value of the speed control variable. Relatedly, in some embodiments, the pre-implementation process can also include adjusting the values of the speed change delay timers in the memory of the programable controller 22 such that they are longer than any ramp up or ramp down times for the priority component 24 to additionally avoid jams in the assembly line system 20. In some embodiments, the timer delay value can be approximately 10 seconds.

In some embodiments, the programable controller 22 can include a speed locking feature that can maintain a predetermined budgeted machine speed. In some embodiments, the programmable controller 22 can track the time for which the speed of the priority component 22 has been changed from the predetermined budgeted machine speed, a user account that changed the speed, and the number of times the speed has been changed in a shift. In some embodiments, the programable controller 22 can limit an operator user account to three speed changes lasting 60 minutes each per shift with the option to extend a speed change if issues are not resolved. In some embodiments, supervisor user accounts can perform an override and maintain a speed change for a whole shift.

From the foregoing, it will be seen that the various embodiments of the present invention are well adapted to attain all the objectives and advantages hereinabove set forth together with still other advantages which are obvious and which are inherent to the present structures. It will be understood that certain features and sub-combinations of the present embodiments are of utility and may be employed without reference to other features and sub-combinations. Since many possible embodiments of the present invention may be made without departing from the spirit and scope of the present invention, it is also to be understood that all disclosures herein set forth or illustrated in the accompanying drawings are to be interpreted as illustrative only and not limiting. The various constructions described above and illustrated in the drawings are presented by way of example only and are not intended to limit the concepts, principles and scope of the present invention.

Many changes, modifications, variations and other uses and applications of the present invention will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An assembly line system comprising:
a programable controller;
a priority component comprising a filler configured to fill empty containers with one or more of a liquid and a dispensable product, thus producing filled containers;
a first section upstream of the priority component configured to deliver the empty containers to the priority component and including at least one upstream backup detecting sensor; and
a second section downstream of the priority component configured to receive and transport filled containers away from the priority component and including at least one downstream backup detecting sensor,
wherein the programable controller is configured to:
determine whether there is an upstream backup along the first section based on signals from the upstream backup detecting sensor, the upstream backup indicating too few empty containers being delivered to the priority component;
determine whether there is a downstream backup along the second section based on signals from the downstream backup detecting sensor, the downstream backup indicating a lack of space for filled containers along the second section;

determine a number of speed changes instances that an operating speed of the priority component has already been adjusted within a predetermined preceding time period;
determine a speed change elapsed time that the operating speed of the priority component has already been adjusted within the predetermined preceding time period; and
adjust the operating speed of the priority component if
one or more of the upstream backup and the downstream backup is present,
the number of speed change instances within the predetermined preceding time period is less than a speed change instance threshold, and
the speed change elapsed time within the predetermined preceding time period is less than a speed change elapsed time threshold.

2. The assembly line system of claim 1, wherein the first section includes a depalletizer configured to remove unfilled containers from pallets.

3. The assembly line system of claim 1, wherein the second section includes
a pasteurizer configured to pasteurize one or more of the liquid and the dispensable product;
one or more accumulation tables;
a packer configured to package groups of filled containers; and
a palletizer configured to place the groups of filled containers onto pallets.

4. The assembly line system of claim 1, wherein the programable controller is further configured to adjust a speed of a conveyer belt that is located within the first section upstream of the priority component.

5. The assembly line system of claim 1, wherein the programable controller is further configured to set the operating speed of the priority component to high in response to determining that there is no upstream backup in the first section or downstream back up in the second section.

6. The assembly line system of claim 1, wherein the programable controller is further configured to set the operating speed of the priority component to low in response to determining that the upstream backup is present in the first section or the downstream backup is present in the second section.

7. The assembly line system of claim 1, wherein the programable controller is further configured to:
calculate an upstream accumulation percentage based on a current status of the at least one upstream backup detecting sensor; and
determine whether the upstream backup is present in the first section based on the upstream accumulation percentage.

8. The assembly line system of claim 1, wherein the programable controller is further configured to:
determine a maximum downstream accumulation percentage;
determine a current accumulation percentage; and
determine whether the downstream backup is present in the second section based on the maximum downstream accumulation percentage and the current accumulation percentage.

* * * * *